United States Patent
Ronk

[15] 3,670,238
[45] June 13, 1972

[54] ROTARY DYNAMOELECTRIC MACHINE HAVING HIGH-RESISTANCE ROTOR

[72] Inventor: Leroy B. Ronk, Nokomis, Ill.
[73] Assignee: Ronk Electrical Industries, Inc., Nokomis, Ill.
[22] Filed: June 16, 1971
[21] Appl. No.: 153,567

[52] U.S. Cl. ............................................. 321/55, 310/211
[51] Int. Cl. ........................................................ H02m 5/00
[58] Field of Search ........................... 310/129, 211; 321/55

[56] References Cited

UNITED STATES PATENTS

| | | | |
|---|---|---|---|
| 2,139,748 | 12/1938 | Harrell | 310/211 |
| 3,202,896 | 8/1965 | Lewus | 321/55 X |
| 3,271,646 | 9/1966 | Lewus | 321/55 X |
| 3,387,202 | 6/1968 | Buffington | 321/55 |

Primary Examiner—William M. Shoop, Jr.
Attorney—Koenig, Senninger, Powers and Leavitt

[57] ABSTRACT

A rotary dynamoelectric machine having a generally annular stator including first and second primary windings oriented at 90° electrical phase relationship with respect to one another, the second winding having approximately 0.845 the number of effective turns of the first winding. An induction rotor of the machine has a cylindrical laminated ferromagnetic core positioned within the stator for rotation about a central axis thereof when the stator is energized by an a.c. power source. The rotor is of single-bar squirrel-cage construction having a plurality of electrically conductive bars each extending the length of the core adjacent the cylindrical surface thereof. Conductive end rings at the ends of the rotor electrically are connected to the ends of the bars at the respective ends of the core. The bars and end rings provide a secondary winding and are physically dimensioned such as to provide this secondary winding with a relatively high resistance, viz., at least twice the resistance of a rotor of conventional commercial design. The windings are interconnected with a source of single-phase a.c. power source to permit the machine to be used either as a self-starting rotary phase converter for supplying three-phase power to a load or as a motor having low inrush current.

25 Claims, 14 Drawing Figures

ROTARY DYNAMOELECTRIC MACHINE HAVING HIGH-RESISTANCE ROTOR

BACKGROUND OF THE INVENTION

This invention relates to a.c. rotary dynamoelectric machines of the squirrel-cage induction type and more particularly to such a machine which can be used as a rotary phase converter or as a motor.

In many localities, as in rural or remote parts of the country, three-phase a.c. utility power is either not provided or not available. Instead, only single-phase service may be supplied. This presents certain problems for utility customers. First, it may be necessary or preferred to operate three-phase equipment. For example, three-phase motors are both widely available, as in unit-horsepower sizes, and desirable because of their efficiency, operating characteristics, and also because three-phase power may at some future time become available. Thus, either three-phase service must be extended to the customer at considerable expense or some type of phase converter must be used to provide conversion of the single-phase to three-phase power. A difficulty often encountered with phase converters, regardless of whether of the static or rotary type, is that they may not be able to supply the three-phase power having satisfactory phase balance, particularly where the magnitude of the load or power factor is subject to variation over more than a limited range. In addition, previous rotary phase converters have heretofore required relatively expensive and unreliable electrolytic starting capacitors and associated starting relay or switching mechanisms.

Another type of problem which may be encountered, where it is required to operate from a single-phase power source, it that the peak current demand may be limited to a relatively low value. For example, a utility company typically may not permit a demand of greater than 260 amperes from a 230 volt single-phase line, or else may charge a considerable amount for higher demand service. Thus a utility customer desiring to operate a motor is severely restricted as to the size of motor which can be used, since normally a single-phase motor has a starting current which is several times (e.g., five to six times) its normal running current. In this example, the customer would be precluded from using a single-phase motor of greater than about 10 horsepower (such a motor having a starting current of 200-240 amperes). Notwithstanding this motor size limitation, it is typically required also that the motor be started with electrolytic starting capacitors and associated starting switchgear.

SUMMARY OF THE INVENTION

Among the several objects of the invention may be noted the provision of an improved rotary dynamoelectric machine; the provision of such a dynamoelectric machine having superior electrical characteristics; the provision of such a dynamoelectric machine which can be employed as either a rotary phase converter for conversion of single-phase a.c. power to three-phase a.c. power, or which can be employed as a motor for operation from either single-phase, two-phase, or three-phase a.c. power, which motor requires relatively low inrush current upon starting; the provision of such a dynamoelectric machine which, when used as a rotary phase converter, is self-starting, i.e., requires not starting capacitors or starting switchgear; the provision of such a rotary phase converter which can be used to supply well-balanced three-phase a.c. power from a single-phase source to a wide range of electrical loads and over a wide range of power factors; the provision of such a rotary phase converter permitting ready adjustment, through changing of winding taps or winding interconnections, to accommodate different electrical loads or power factors; the provision of such a dynamoelectric machine constituting a motor which is self-starting, requiring no starting capacitors or starting switchgear; the provision of such a motor which can be operated in a motor system such that the maximum inrush current upon motor starting is approximately the same as, or slightly less than, the current supplied to the motor during normal running thereof; and the provision of such a dynamoelectric machine which is of relatively simple, inexpensive and easily manufactured construction. Other objects and features will be in part apparent and in part pointed out hereinafter.

Briefly, a rotary dynamoelectric machine constructed in accordance with the invention comprises a generally annular stator including a first primary winding and a second primary winding oriented at 90° electrical phase relationship with respect to the first winding, the second winding having approximately 0.845 the number of effective turns of the first winding. The windings are adapted to be interconnected with a capacitance to a source of single-phase a.c. power. An induction rotor of the machine includes a cylindrical laminated ferromagnetic core positioned within said stator for rotation about a central axis thereof when said stator is energized by the power source. The rotor is of the squirrel-cage type and of single-bar construction and has a plurality of electrically conductive bars each extending the length of the core adjacent the cylindrical surface thereof and conductive end rings at the ends of said rotor electrically connected to the ends of said bars at the respective ends of the core thereby to provide a secondary winding. In accordance with the invention, the physical configurations and dimensions of these bars and end rings are such as to provide said secondary winding with a relatively high resistance. As a result, when the first winding is connected across the single-phase a.c. power source and the second winding is serially connected with a capacitance from one side of said a.c. source to an intermediate tap on said first winding, the machine comprises a self-starting rotary phase converter and three-phase a.c. power is provided at three terminals comprising the opposite ends of portions of the first winding and the junction between the capacitance and said second winding. Alternatively, when the first winding and a capacitance are connected across said a.c. source and the second winding is connected across the a.c. source, the machine comprises a motor requiring relatively low inrush current upon starting. The motor can be connected so as to have an inrush current upon starting which is approximately the same as, or slightly lower than, the full-load normal running current.

BRIEF DESCRIPTION OF THE DRAWINGS

Corresponding reference characters indicate corresponding parts throughout the several views of the drawings.

DESCRIPTION OF THE PREFERRED EMBODIMENTS

A highly efficient and economical method of producing three-phase a.c. power from a single-phase source involves the use of a rotary phase converter. As described herein, such a converter is a rotary transformer with which capacitors are interconnected to supply balanced three-phase power to a load such as one or more three-phase motors. In accordance with this invention, such a rotary transformer is constructed substantially in accordance with motor theory and is, in fact, in the form of a motor. I.e., the machine includes a generally annular stator (as is conventional) and an induction rotor of the squirrel-cage type, there being no need for an output shaft, however.

The stator is specially provided with two primary windings which are displaced 90° out of phase. Each of the windings is constituted by a set of coils arranged in belts providing four-pole configuration. The principle of providing stator windings with 90° phase displacement will be apparent to those skilled in the art. In accordance with the invention, one of the windings has approximately 0.845 the number of effective turns of the other winding. The figure 0.845 is employed for best results in machines of the invention.

The rotor is of special single-bar construction. It includes a single set of parallel bars electrically connected to end rings at each end of the rotor to provide a secondary winding comprising a plurality of parallel-connected shorted turns. The bars and end rings are especially configured and dimensioned to provide this secondary winding with resistance which is considerably higher than what has heretofore been considered good conventional design practice.

Figure 1:
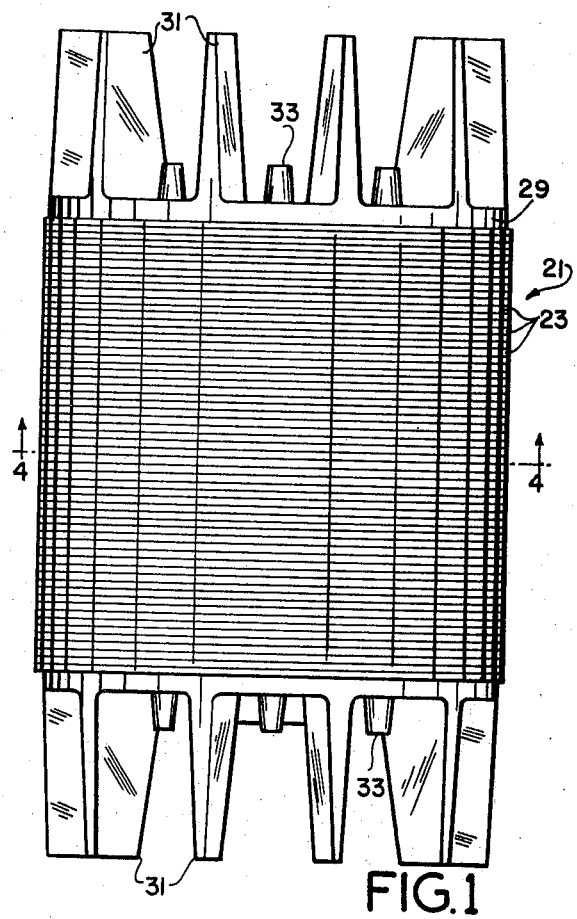
FIG. 1 is a view in side elevation of the rotor of an improved rotary dynamoelectric machine constructed according to this invention.
Figure 3:
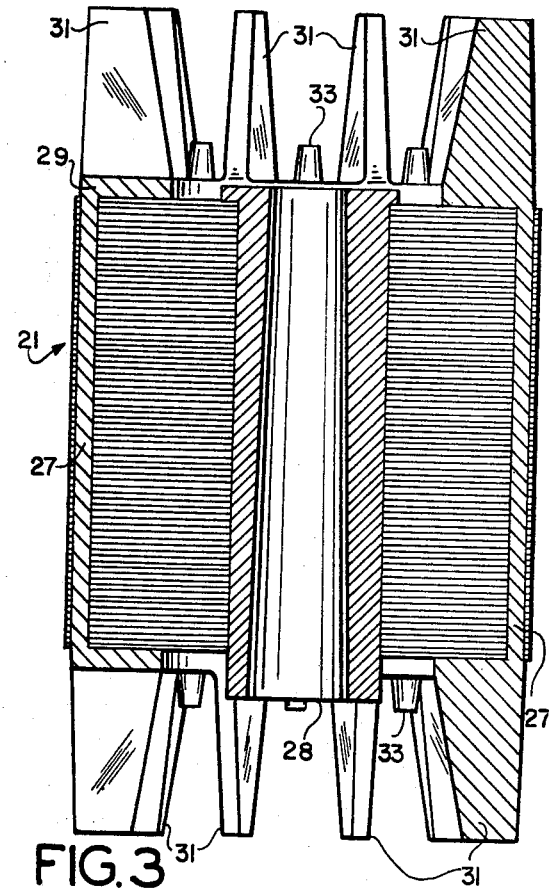
FIG. 3 is a revolved longitudinal cross-sectional view of the FIG. 1 rotor taken along line 3—3 of FIG. 2.
Figure 2:
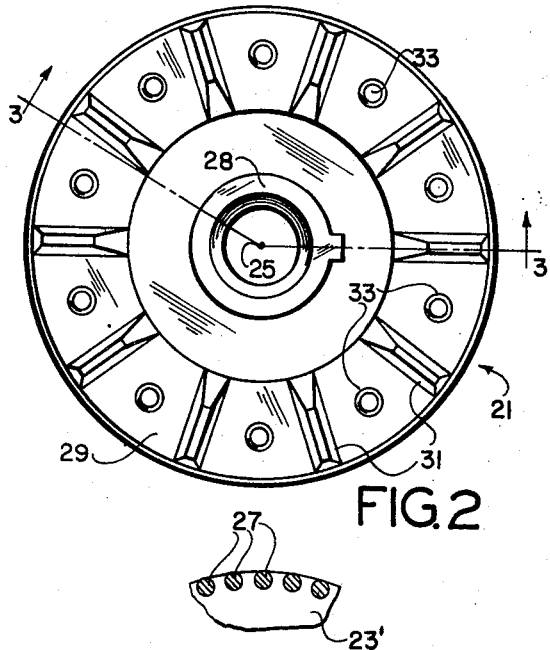
FIG. 2 is an end elevational view of the FIG. 1 rotor.
Figure 4:
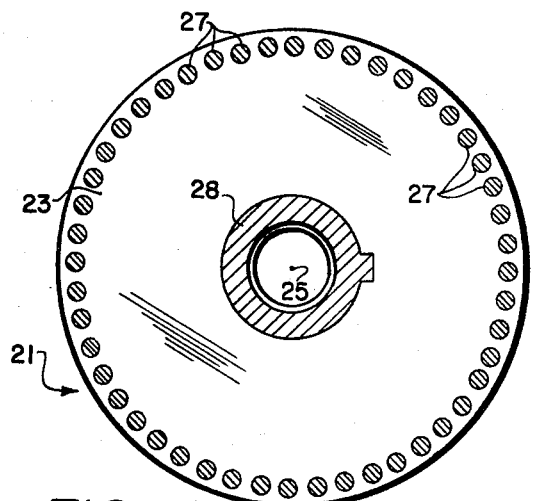
FIG. 4 is a lateral cross-sectional view of the rotor taken along line 4—4 of FIG. 1.

A rotor of the present invention is shown in FIGS. 1-5 wherein the rotor is designated generally 21. It comprises a cylindrical core of numerous individual ferromagnetic laminations 23 each of circular cross section as shown in FIG. 4. The rotor is of course adapted for rotation within the bore of a stator about a longitudinal central axis 25. Rotor 21 includes 48 substantially identical bars 27 each of circular cross section. Other cross sections can be employed, but the circular form is preferred in the construction of a rotary dynamoelectric machine of this invention. Bars 27 are parallel to one another and extend the length of respective peripheral slots such that the bars are adjacent the cylindrical surface of the core. The bars are slightly skewed with respect to axis 25, as is conventional, the skew angle being approximately 1° to 1¼°, so that the bars will each overlap one set of stator slots to prevent the rotor from stalling or locking up.

Bars 27 are preferably of aluminum and are advantageously provided by a method of centrifugal casting. This method casts the bars integrally with end rings and cooling fins. Rather than employing this method, the rotor can be built with copper bar construction, as is typically utilized in assembling motors having high horsepower ratings. In that event, the copper bars are solidly connected to end rings. In either type of construction, the bars are thus electrically connected to the end rings.

Rotor 21 is shown as having a stub shaft 28 useful in maintaining alignment of the laminations 23 during the casting process. Stub shaft 28 is keyed to the laminations as indicated. The casting process is such that molten aluminum passes down through stub shaft 28 and then, under centrifugal force, forms the lower end rings and fins, passes upward through the slots to form the bars and, finally, continues upward to form the upper end ring and fins. The stub shaft is later pressed out and replaced with a suitable finished shaft which is keyed to the rotor and extends from opposite ends of the rotor and which can be journalled in bearings for rotation within the stator bore.

These end rings are designated 29 and are substantially identical, each being of generally flat, washer-like form and of rectangular cross section, thus having a generally uniform thickness along axis 25. Each end ring 29 includes ten equispaced cooling fins 31 cast integrally with the end ring. Small frustoconical projections 33 also extend longitudinally outwardly from each end ring 29 and are useful in balancing the rotor. Small balancing weights in the form of washers can be secured to the rotor by the projections 33 when the latter are deformed.

Figure 5:
FIG. 5 is a fragmentary cross-sectional view similar to FIG. 4 and showing a rotor modification.

In using rotor 21 in a rotary phase converter of the invention, it is preferred that the rotor be turned down to reduce its diameter slightly so that each of the bars 27 has a small portion of its peripheral surface along its entire length exposed at the periphery of the rotor, as illustrated in FIG. 5, which shows a portion of a lamination 23' whose diameter is slightly reduced from that shown in FIG. 4. Thus a partially opened slot configuration results which increases the rotor reactance for improving starting characteristics somewhat over the completely closed slot configuration of FIGS. 1-4.

In sharp contrast with the customary expectation that a high resistance rotor would cause serious shortcomings in performance, a rotary dynamoelectric machine of such construction unexpectedly provides superior electrical characteristics and great flexibility. Not only does this construction result in a particularly efficient rotary phase converter, but also such a rotary converter which is self-starting, i.e., which does not require expensive electrolytic starting capacitors and associated switchgear. Unique flexibility is provided in that such a dynamoelectric machine can also be used as a motor having certain marked advantages. For example, as a motor, the machine also exhibits a self-starting capability, requiring no electrolytic capacitors, switchgear, and so forth. Significantly also, such a motor requires relatively low inrush current upon starting and, in fact, can be connected so that the inrush current is approximately the same or actually less than the normal running current under full-load conditions.

That such a rotary phase converter, or rotary transformer, can be designed according to motor theory follows from the operative principle that a polyphase induction motor is, in principle, a transformer whose magnetic circuit is separated by an air gap into two relatively movable portions, viz., stator and rotor. The stator includes the primary windings while the rotor provides the secondary winding in which the currents are created by induction. At standstill, the equivalence of a rotary converter to a polyphase transformer is thus readily apparent. Conventionally, motor design theory takes such considerations into account. Common practice is to use the so-called Steinmetz equivalent circuit to evaluate motor performance according to established circuit theory. Thus performance calculations can be undertaken to determine torque, power factor, and other performance characteristics as functions of various material properties, dimensions, or other motor design factors. Such motor design theory is conventionally employed in the design of motors and is discussed, for example, in the *Standard Handbook for Electrical Engineers* (Fink and Carroll, ed.), 10th ed., McGraw-Hill Book Company, 1968.

One of the factors which has important relation to the torque and slip (slip being defined as the ratio of the difference between the rotor synchronous speed $N_s$ and its actual speed N to the synchronous speed $N_s$), is the effective secondary resistance, or so-called effective rotor resistance, $R_2$. In the conventional design of commercial three-phase induction motors designed to have a particular horsepower rating and slip, the effective rotor resistance $R_2$ must be taken into account, since by preselecting the value of $R_2$, the slip at which maximum rotor torque occurs can be established.

With the rotor at standstill, the equivalent rotor resistance $R_2$ is equal to the total rotor resistance $R_r$ times the square of the stator-to-rotor turns ratio. It can be established that $R_r$ is given by the relationship $$R_r = c\left(\frac{1_b}{S_b N_b} + \frac{0.64\ D_{er}}{P^2 S_{er}}K\right)$$

where $$c = N_s^2 k_P^2 k_d^2 n r \times 10^{-6}$$

and where $1_b$ = effective length of a rotor bar in inches
$S_b$ = section area of the bar in square inches
$N_b$ = number of rotor bars
$D_{er}$ = outside diameter of an end ring in inches
$S_{er}$ = section area of an end ring in square inches
$P$ = number of poles
$K$ = constant by which the end ring resistance is effectively multiplied to include the effect of non-uniform current distribution
$N_s$ = synchronous speed in revolutions per minute (RPM)
$k_P$ = pitch factor (a factor relating to the throw or span of the stator coils)
$k_d$ = stator winding distribution factor
$n$ = number of phases
$r$ = resistivity of copper in ohm-inches
    ($r = 0.826$ ohm-in. at 75° C.)

This relationship for $R_r$ is developed in the textbook by J.H. Kuhlman, *Design of Electrical Apparatus*, 3d ed., John Wiley & Sons, New York.

Thus it may be seen that various physical dimensions of the rotor bars and end rings have precise and definite bearing on the rotor resistance $R_r$ and can be varied so as to establish the value of the rotor resistance.

In the construction of a rotor of the invention to provide a rotary dynamoelectric machine constituting either a rotary phase converter or a motor, the bars and end rings are configured and dimensioned such that the resistance $R_r$ (given by the above relationship) of the secondary winding constituted by the rotor is relatively high. By this is meant that its resistance is considerably higher than that of a three-phase squirrel-cage motor rotor of conventional commercial design, assuming substantially the same horsepower rating and slip. More specifically, the resistance is approximately at least twice that of conventional design and preferably from two to three times the conventional value as determined by reasonably careful and customary design practice according to the above-described relationship for $R_r$.

One especially convenient way of changing rotor resistance is to vary the thickness of the end rings. It has been determined that a rotor according to the invention can provide satisfactory results if the thickness of end rings of the form shown in FIGS. 1-4 is from about two-thirds to about one-fourth of the thickness of end rings of a squirrel-cage motor rotor of conventional commercial design. An end ring thickness of two-thirds of that according to conventional design is found to provide a resistance of approximately twice normal, while an end ring thickness of one-fourth of that of conventional design provides approximately three times normal resistance. In attempting to reduce end ring thickness to less than one-fourth of standard, certain mechanical limitations are encountered, even through a greater rotor resistance may be desirable in some circumstances. On the other hand, an end ring thickness of greater than two-thirds of standard seriously reduces the electrical efficiency and degrades performance characteristics of a rotary machine using the rotor and thus eliminates the advantages of the invention. Rotors designed according to the invention having end ring thicknesses of one-half and one-third have been determined to provide entirely satisfactory results.

The above formula or relationship for total rotor resistance $R_r$ can be readily used as a basis for comparing one motor to another in terms of rotor parameters without calculating the value of $c$, noting that $c$ is constant from one motor to another, assuming no change in synchronous speed, pitch or winding distribution factors, and number of phases.

Such a comparison between motors of different manufacture is also facilitated by the standardization of frame sizes within the motor industry by the National Electrical Manufacturers Association (NEMA), it being common practice to design motors according to standard NEMA frame sizes and of certain integral horsepower ratings, e.g., 10 h.p., 20 h.p., 25 h.p., and so forth.

The following specifically illustrates how one can take into effect the foregoing considerations in the design of a motor according to the invention. Assuming a constant value for $c$ in the above relationship, three standard 20 h.p. motors of different manufacture, each of NEMA 256T frame size, may be considered.

Calculating $R_r$ as a function of $c$ for a first such motor having 40 rotor bars of aluminum, with the factor $K$ being equal to 0.95, $$R_r = \left(\frac{5.625}{0.1228 \times 40} + \frac{0.64 \times 6.714 \times 0.95}{16 \times 0.9}\right)c = 1.463c.$$

For a second such motor of different manufacture having 58 aluminum bars, $K$ being equal to 0.99, $$R_r = \left(\frac{5.750}{0.1113 \times 58} + \frac{0.64 \times 5.010 \times 0.99}{16 \times 0.1875}\right)c = 1.41c.$$

A third such motor of still different manufacture but with 58 bars of copper, $K$ being unity, provides an apparent value for $R_r$ of $$R_r = \left(\frac{6.5}{0.075 \times 58} + \frac{0.64 \times 5.010}{16 \times 0.1875}\right) = 2.559c.$$

But taking into effect the ratio resistivities of copper and aluminum, $R_r$ is actually found to be $$R_r = \frac{0.692}{1.257} \times 2.559c = 1.41c.$$

A motor was based upon the latter motor and employed cast aluminum rather than copper bars, but had an effective bar length of 5.75 in. and an end ring diameter of 6.4 in. It was shown that $$R_r = \left(\frac{5.75}{S_b \times 58} + \frac{0.64 \times 6.4}{16 \times S_{er}}\right)c = 1.45c,$$

which is equivalent to the effective resistance of the latter copper bar motor. The resistance of the rotor bars, which had a section area equal to 0.1084 in.², resulted in $$R_b = \frac{5.75}{0.184 \times 58} = 0.914c.$$

Thus $$\frac{0.64 \times 6.4}{16 \times S_{er}}K = 1.45 - 0.914c = 0.536.$$

The factor K was about 1.05. Solving for $S_{er}$ yields $$S_{er} = \frac{0.64 \times 6.4}{16 \times 0.536} = 0.491\ \text{in.}^2$$

Tests have shown that a rotor constructed according to these dimensions provides performance equivalent to the copper-bar rotor, with slip of about 3–5 percent.

If now the end ring thickness is reduced by one-half and employed in a rotor having 48 cast aluminum bars each of cross section 0.0551 in.², then $$R_r = \left(\frac{5.75}{0.0551 \times 48} + 1.072\right)c = 3.247c.$$

Thus the rotor secondary winding resistance as a factor of the equivalent conventional rotor having $R_r = 1.45\ c$ is given by $$\frac{3.247c}{1.45c} = 2.24.$$

In other words, the rotor has 2.24 times the resistance of the secondary winding provided by the equivalent three-phase squirrel-cage motor rotor of conventional design.

If the end rings were of one-third rather than one-half standard thickness, $R_r$ can be calculated as being equal to $3.775c$ which is 2.6 times that of the equivalent conventional design. It can be similarly shown that end rings of two-thirds and one-fourth standard thickness provided $R_r$ of $2.979c$ and $4.319c$, respectively. These are 2.06 and 2.97 times that of the equivalent commercial design. These various dimensions and calculations have been verified by test results.

Referring now to FIGS. 6–9, circuit diagrams are shown which illustrate the features and operation of the present rotary phase converter. Such a rotary converter is designated 35 and its stator includes a first winding 37 having a set of four interconnected coils 39–45 corresponding to four stator poles. A second winding 47 includes a set of four similarly connected coils 49–55. Winding 47 is oriented at 90° electrical phase relationship with respect to winding 37. Each of the windings has its coils connected in parallel pair arrangement. The number of turns in each winding from end to end is such that winding 47 has approximately 0.845 the number of effective turns of winding 37. Accordingly, winding 47 may be thought of as the 84.5 percent winding and winding 37 may be regarded as the 100 percent winding.

Winding 37 includes three taps designated L, M and H, the latter two being provided on both of coils 39 and 41 and being tied together as indicated. The lower end of winding 47 is adapted to be connected to one of these taps, which correspond to low, medium and high, the tap connection being chosen to provide phase balance according to the magnitude and characteristics of the three-phase load to which converter 35 supplies three-phase power. It will be understood that such taps and the lower end of winding 47 are made accessible by leads connected thereto which are brought out of the converter housing. Tap L is located at the midpoint of winding 37 while taps M and H are at approximately 12 percent and 25 percent of the span of this winding from centerpoint tap L. Thus tap H is approximately at the midpoint of each of coils 39 and 41, while tap M is approximately midway between taps L and H.

Single-phase a.c. power, e.g., of 230 v. at 60 Hz, is supplied across winding 37 via a pair of terminals 57 and 59 by means of power leads L1 and L2 which include a gauged main power switch PS and a pair of fuses F1 and F2. To a third terminal 61 is connected the upper end of winding 47. A capacitance includes a plurality of capacitors, here shown as two capacitors C1 and C2, which are connected across terminals 59 and 61. Thus winding 47 is connected in series with this capacitance from the right end of winding 37 and one of the taps, tap L being shown connected here.

When power switch PS is closed, rotary converter 35 is energized and thus starts and its rotor comes up to synchronous speed, i.e., 1,800 RPM. Three-phase a.c. power at 230 v. and 60 Hz is then supplied via power leads L3–L5 connected to terminals 57–61, respectively. As is seen, these terminals 57 and 59 are interconnected with the opposite ends of winding 37 and terminal 61 represents the junction between winding 47 and the capacitance C1 and C2.

Two three-phase wye-wound induction motors are shown connected for operation from leads L3–L5, each being conventionally equipped with a motor starter contactor MSC each having main power contacts K connected between each motor M and leads L3–L5. The coil of each contactor MSC is energized upon momentary closure of a normally open pushbutton start or run switch RS. A pair of latching contacts K' of the contactor MSC is connected across each run switch RS for maintaining contactor energization. Each motor M can be stopped by momentary opening of a normally closed pushbutton stop switch SS connected in series with the contactor coil. Conventional bimetal overload switches OLS are connected within motor leads.

Figure 6:
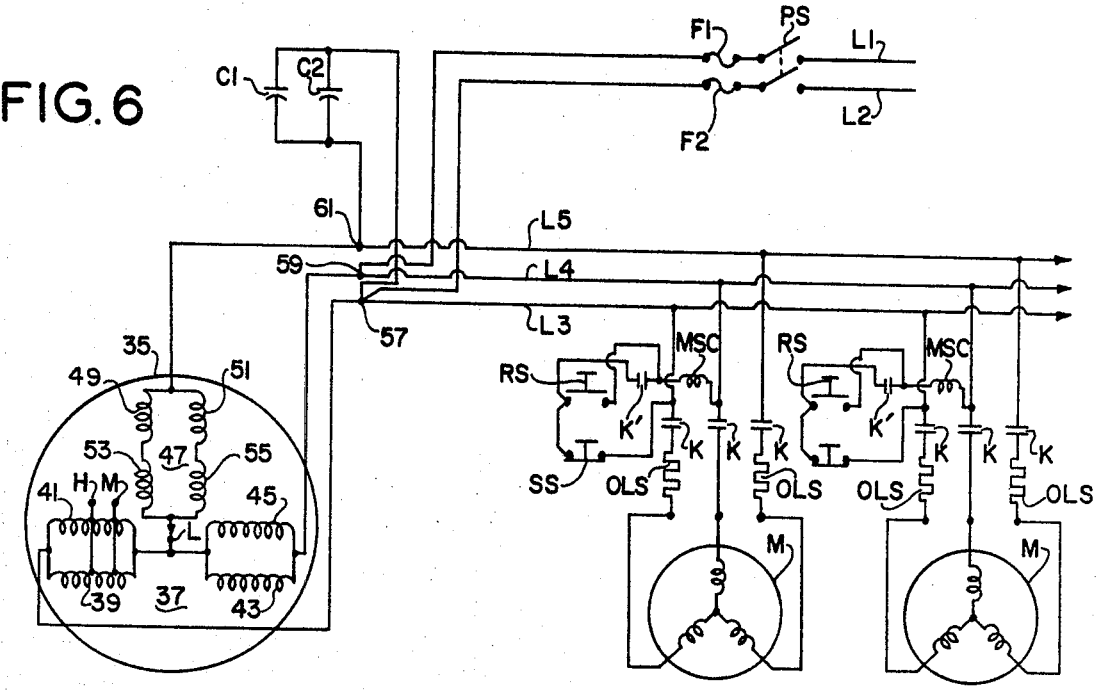
FIG. 6 is a schematic circuit diagram of a system using a rotary phase converter of the invention for operation of three-phase loads from a single-phase a.c. source.

The amount of capacitance C1 and C2 required for satisfactory phase balance is dependent upon the output load capability of the converter and the size of the three-phase load connected to it. The capacitance should total about 25 mfd. per h.p. of the total motor load the converter can handle. For example, if a converter can handle a total motor load of 40 h.p., the capacitance should be at least $40 \times 25$ mfd. = 1,000 mfd. In addition, the capacitance should be increased by about 25 mfd. per h.p. of connected load. Thus, if motors totalling 10 h.p. are operated by the converter, the total capacitance may be increased to 250 mfd. Increased capacitance is normally used only when the connected load exceeds one-half of the rotary converter's rated horsepower. Some of this additional capacitance may be connected, as required, only when a selected one of the motors is operated, rather than always being connected as shown in FIG. 6.

While the present rotary converter provides particular advantages in operating motor loads which are inductive in character and produce a large lagging power factor, the converter may also be used to operate loads which have a lower power factor, or even a unity or leading power factor. As the lagging power factor becomes lower, the taps L, M and H are chosen for proper phase balance, tap L being that suitable for the least load and power factors nearest unity. If the load approaches a unity power factor or produces a leading rather than lagging current, it may be necessary to reverse the ends of winding 37. Hence a load causing a leading power factor can be operated with satisfactory phase balance. Thus, regardless of load, well-balanced phase-to-phase voltages will exist under all conditions for which adjustments are made.

Moreover, when motors are operated using the rotary converter under normal load conditions, the overall power factor produced at the single-phase input leads L1 and L2 is near unity. This is an important advantage for power suppliers, since nearly all of the current serves as useful power. In operating motors using this converter, either delta or wye-wound motors may be employed. Instant reversal types as well as many other special types of three-phase motors may also be operated. In general, motor loads requiring as much as 200 percent of full-load torque may be started using the converter. Thus also, a breakdown torque of nearly twice full-load torque is possible, with even greater possible breakdown torque if several motors are being simultaneously operated from the converter. Relatively little power loss is produced by the converter itself when operating motors, e.g., of the order of 2 percent of the combined electric power load.

Figure 7:
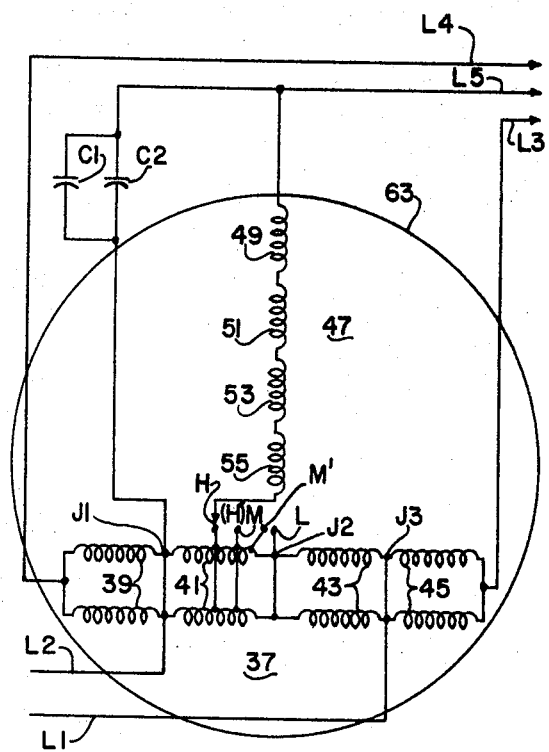
FIG. 7 is a schematic circuit diagram of a rotary phase converter constructed according to the disclosure connected for supplying three-phase power of twice the voltage of the single-phase source.
Figure 8:
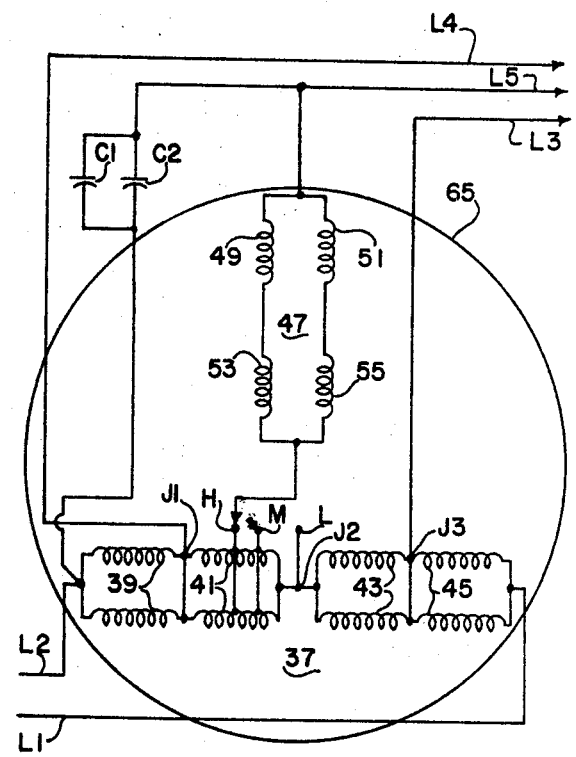
FIG. 8 is a circuit diagram similar to FIG. 2 but showing a connection for supplying three-phase power of half the source voltage.
Figures 9, 10:
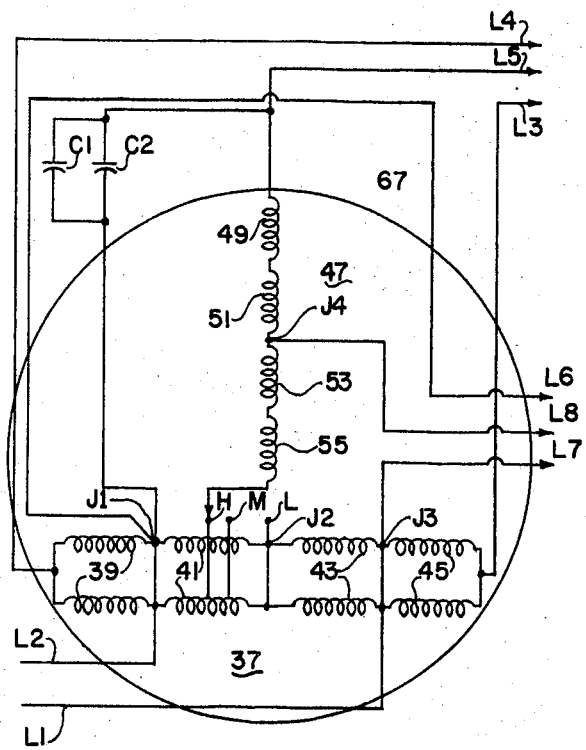
FIG. 9 is a similar circuit diagram illustrating a connection for supplying three-phase power at two different voltages.
FIG. 10 is a developed winding layout diagram illustrating placement of stator windings according to the present disclosure.

Certain specialized applications of the present rotary converter are illustrated in FIGS. 7–9. Referring to FIG. 7, a rotary converter 63 of the invention is shown connected for supplying three-phase a.c. power via leads L3–L5 at a voltage twice that of the single-phase source connected by leads L1 and L2. For example, 460 v. three-phase power can be supplied from a 230 v. single-phase source.

Winding 37 is shown as having its coils 39–45 connected end-to-end in series relationship to provide four portions thereof, with each portion actually being a set of two coils in parallel. A first junction J1 is provided between coil set 39 and 41. A center junction J2 between coil sections 41 and 43 constitutes the midpoint of winding 37, while a third junction J3 is located between coil set 43 and 45. Taps L, M and H are again provided with tap M being about 12 percent of the span of winding 37 between tap L and the left end of winding 37 and tap H being about 25 percent of this span, or the midpoint of coil set 41. A fourth tap M' is provided for use when the converter is reconnected with the coils in parallel for 230 v. output. Tap M then is designated as H'. As in FIG. 6, the appropriate tap is chosen to achieve satisfactory phase balance.

Winding 47 similarly includes four portions constituted by its four coils 49–55 connected in series with the capacitance C1 and C2 between junction J1 and one of the taps, here shown as tap H. The opposite ends of the two central portions of winding 37, viz., coil sets 41 and 43, are connected to the single-phase source by leads L1 and L2. Accordingly, three-phase power of twice the source voltage is provided on leads L3–L5 by three terminals constituting the opposite ends of winding 37 and the junction between winding 47 and the capacitance.

Referring to FIG. 8, a rotary converter 65 is connected for providing three-phase power at half the source voltage. Here, the differences are that winding 47 has its coils 49–55 connected in parallel sets and this winding is connected in series between the left end of winding 37 and the tap. The single-phase source voltage, e.g., 460 v. is connected by leads L1 and L2 across the ends of winding 37. Accordingly, three-phase power of half the source voltage, i.e., at 230 v., is thus provided by leads L3–L5 from three terminals comprising junctions J1 and J3 and the junction between winding 47 and the capacitance.

The embodiment of FIG. 9 shows a rotary converter 67 connected for supplying three-phase power of the source voltage and also of twice the voltage of the source. Rotary converter 67 is connected as in FIG. 7 so that three-phase a.c. power of twice the source voltage is available on leads L3–L5. In addition, however, three-phase power of the source voltage is also available on three leads L6–L8 which are respectively connected to junctions J1 and J3 and to the midpoint of winding 47 which midpoint is the junction designated J4, between coils 51 and 53. Thus, if the single-phase source to which leads L1 and L2 are connected is 230 v., then leads L3–L5 supply 460 v. three-phase power and leads L6–L8 supply 230 v. three-phase power. Accordingly, motors or other loads rated at these two voltages can be simultaneously operated.

FIG. 10 illustrates diagrammatically the layout of the windings of a stator constructed according to the invention. Such a stator has 36 slots. These slots, while being on the inner periphery of the stator and thus concentric with the rotor axis of rotation because of the conventional annular configuration of the stator, are here represented in development by a pair of vertical zig-zag or tooth-like lines. Two lines rather than one are shown to illustrate more clearly how each of the two 84.5 percent and 100 percent windings are laid into their respectively proper slot numbers. Thus the two lines represent, merely for purposes of illustration, slots which face one another. Every sixth slot, including the first, slot 1, has been designated, e.g., slot 6, slot 12, and so forth. The slots appear in continuous repeating fashion from the top to the bottom of the sheet.

The 100 percent winding, which is designated 37 in FIGS. 6–9, is here shown to comprise the four coils designated 39–45 in FIGS. 6–9. Each of these coils actually comprises three concentric groups of several turns of wire. For example, coil 41 includes an inner group 69 having eight turns of wire consisting of three strands (such as two 15-gauge strands and one 14-gauge strand). Group 69 extends from slot 3 to slot 7 and thus has a span of six teeth. Another group 71 has 23 turns and spans six teeth. The outer group 73 also has 23 turns but spans eight teeth or slots. The groups 69–73 are, of course, connected together, one end being designated 75, and provides the tap L as in FIG. 6. The other end of the coil is designated 77. Coil 41 also includes two taps and these are designated M and H and provide those taps so-designated in FIG. 6, for example.

Coil 39 is identical with coil 41 and its ends are designated 79 and 81. Coils 43 and 45 are also identical except that no taps are provided. The ends of these two coils are designated 83–89. Thus it may be seen that winding 37 of FIG. 6 is constituted by connecting together ends 75 and 79 of coils 41 and 39, respectively, to provide tap L, while the ends 77 and 81 of these two coils are connected together to provide the left end of winding 37. Coils 43 and 45 are similarly connected together to provide the right half of winding 37 as viewed in FIG. 6.

The other winding, having 84.5 percent of the effective number of turns of the first (or 100 percent) winding, also has four coils or groups of turns indicated 49–55 as in FIG. 6. These four coils are identically configured. Taking coil 51 as an example, an inner group of turns (also of three strands) is designated 91 and includes 12 turns spanning five slots. A middle group 93 has 22 turns spanning seven teeth or slots. An outer group 95 has 11 turns spanning nine teeth. One end of coil 51 is designated 97. The other end is connected to one end of coil 55 by a lead 99. The other end of coil 55 is designated 101. Coils 49 and 53 are similarly connected, leaving a pair of unconnected ends 103 and 105. Thus, to connect winding 47 as shown in FIG. 6, the coil ends 103 and 97 are connected together to provide the upper end of winding 47, while the lower end is provided by coil ends 101 and 105.

A stator having instead 48 teeth can be similarly wound. In one embodiment of the invention for use as a motor of 25 h.p. rating and using a NEMA 286 frame, the 84.5 percent winding can be wound using four strands of 15-gauge wire and one strand of 14-gauge wire so that there are coils with each of four groups of turns, these groups having seven turns spanning six teeth, 14 turns spanning eight teeth, 14 turns spanning 10 teeth, and seven turns spanning 12 teeth. The 100 percent winding can similarly be provided with five strands laid in four coils, each having groups of eight turns spanning six teeth, 16 turns spanning eight teeth, 16 turns spanning 10 teeth, and eight turns spanning 12 teeth.

Figure 11:
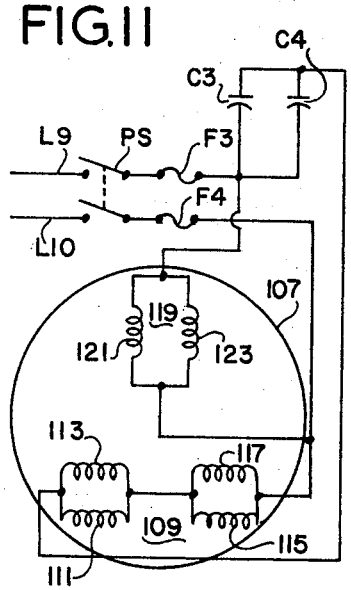
FIG. 11 is a schematic circuit diagram of a motor of the invention connected for self-starting operation from a single-phase a.c. source.

Referring not to FIGS. 11–14, circuit diagrams are shown which illustrate the use of the invention as a motor. FIG. 11 shows a motor 107 constructed in accordance with the foregoing considerations. The 100 percent winding is designated 109 and is shown as having four coil sections 111–117 of two each in parallel. The 84.5 percent winding, which is oriented at 90° electrical phase relationship with respect to winding 109, is designated 119 and is here shown for clarity of illustration as having only two sections 121 and 123. However, each of these is actually two coil sets as in the construction of the rotary converter shown in FIGS. 6–9.

A capacitance, including a plurality of capacitors of which two are shown and designated C3 and C4, is connected in series with winding 109 across a pair of power leads L9 and L10 which supply single-phase a.c. power, e.g., of 230 v., when a main power switch PS is closed. These leads include fuses F3 and F4. Winding 119 is connected across leads L9 and L10. Capacitors C3 and C4, it should be noted, are of the conventional oil-filled type, and are not the electrolytic type used for starting purposes. Upon closing power switch PS, motor 107 starts satisfactorily without starting capacitors and operates as a normal motor. Thus it is self-starting. Significantly, the inrush current upon starting is relatively low, being typically from about two to about three times the normal running, i.e., full-load current. The slip is typically about 3 – 4 percent.

Figure 12:
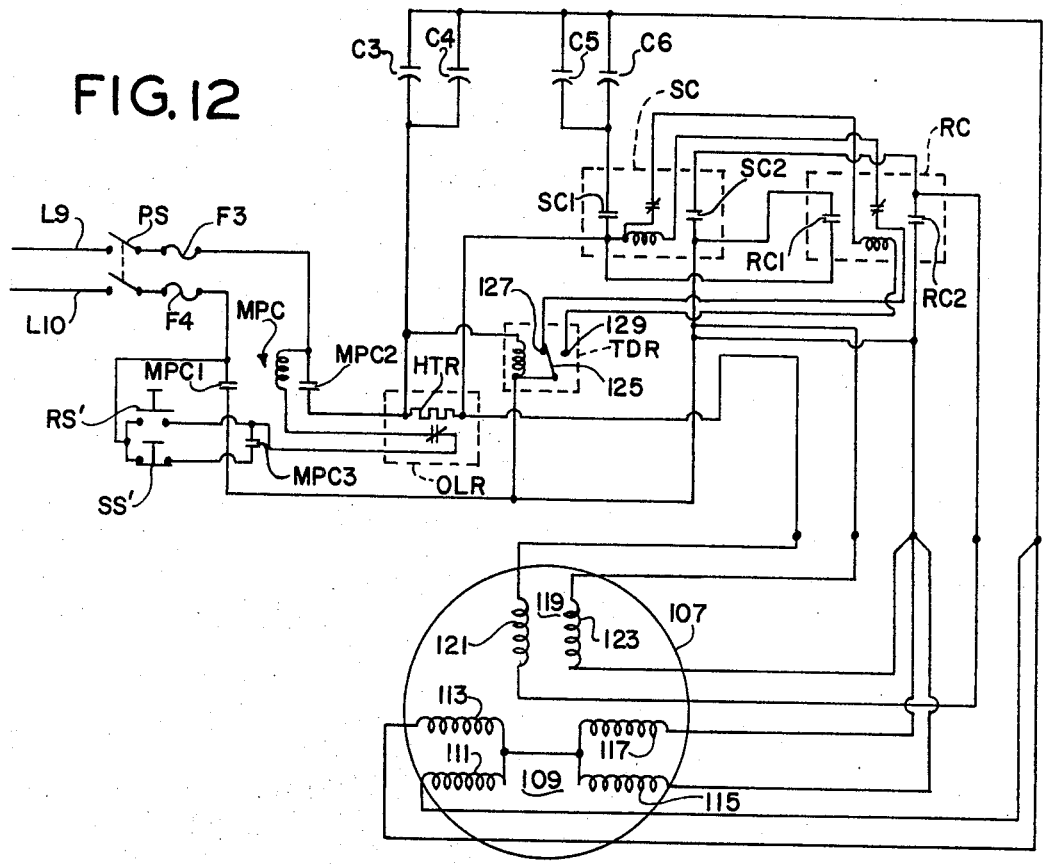
FIG. 12 is a schematic circuit diagram of a system utilizing a motor of the invention to provide extremely low inrush current upon starting.

FIG. 12 illustrates a system using motor 107 so that it provides extremely low inrush current upon starting. A main power magnetic contactor MPC includes main contacts MPC1 and MPC2 connected with leads L9 and L10 for controlling the delivery of a.c. power to the motor under control of respective pushbutton start and stop switches RS' and SS' which control energization of the contactor coil. Latching contacts MPC 3 are connected for maintaining energization of the contactor. The normally closed contacts of a conventional overload relay OLR, having a heater or bimetal element HTR in one of the motor phase leads, are also connected with the coil of contactor MPC.

A time delay relay TDR has its coil connected across the power leads for controlling motor starting timing. It includes a blade 125 adapted to transfer from a contact 127 to a contact 129 after a short interval, e.g., 8 seconds following energization of contactor MPC. These contacts 127 and 129 are interconnected with the coil of a running contactor RC and a starting contactor SC as illustrated for the purpose of causing energization of the starting contactor SC initially, but energization of the running contactor RC and deenergization of starting contactor SC upon transfer of blade 125 at the completion of the delay interval.

Starting contactor SC includes normally open main contacts SC1 which therefore close upon starting to connect two or more electrolytic capacitors C5 and C6 in parallel with normal oil-filled running capacitors C3 and C4 upon starting. This total capacitance is thus connected in series with winding 109 across the a.c. source. Another set of normally open contacts SC2 closes to connect sections 121 and 123 of winding 119 in series with each other upon starting across the source.

At the end of the delay, starting contactor SC is deenergized and running contactor RC is instead energized, causing normally open contacts RC1 and RC2 to close. These contacts effectively connect winding sections 121 and 123 in parallel across the source as in FIG. 11 for normal running. Deenergization of starting contactor SC effectively disconnects the electrolytic starting capacitors C5 and C6. Thus only capacitors C3 and C4 remain in series with winding 109 following motor starting. Accordingly, normal running operation of motor 107 is with winding sections 121 and 123 in parallel across the a.c. source and only capacitors C3 and C4 in series with winding 109 across the source.

The system of FIG. 12 operates to provide an inrush current upon starting which is actually somewhat less than normal full-load running current. For example, a 20 h.p. motor of the invention with a slip of about 6 percent has a full-load current of about 77 amp. while the inrush or locked rotor current is only about 65 amp., with current not peaking under any circumstances during the starting cycle to greater than about 130 amp., but typically less than this utilizing proper starting cycle timing.

Figure 13:
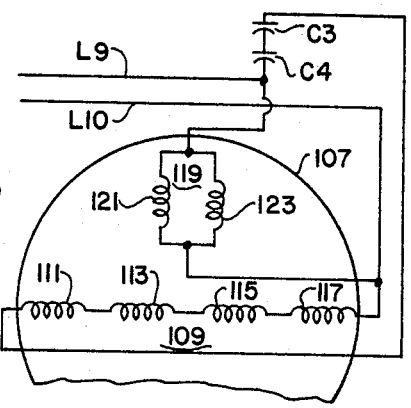
FIG. 13 is a circuit diagram illustrating a connection of the motor permitting certain economies.

FIG. 13 illustrates a more efficient utilization of capacitors C3 and C4 so that they are operated nearer their rated voltage. Here, capacitors C3 and C4 are connected in series with winding 109 across the a.c. source, e.g., of 230 volts. Winding 109 is connected with its coils or sections 111 – 117 in end-to-end or series configuration. Relatively low inrush current and self-starting are obtained with this circuit, as with that of FIG. 11.

Figure 14:
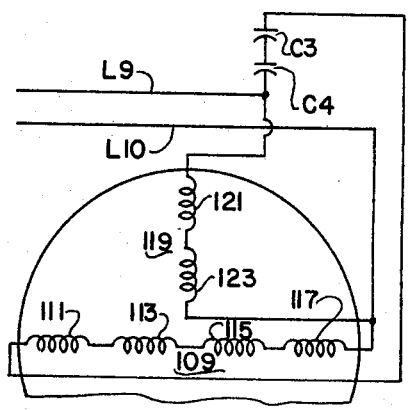
FIG. 14 is another circuit diagram illustrating a connection of the motor for operation from a higher voltage a.c. source.

Referring to FIG. 14, motor 107 is connected for operation from a source voltage much higher than in FIGS. 11 and 13. Here, the single-phase source may have a voltage of 460 v., for example. To operate motor 107 at this voltage, winding sections 121 and 123 are connected in series across the a.c. input leads and the coils 111 – 117 of winding 109 are also series-connected with the capacitors C3 and C4, which are themselves series-connected. The several advantages of the invention apply as well to this arrangement.

Two specific examples illustrate typical dimensions involved in constructing motors of the invention. These dimensions are equally applicable to the construction of a rotary converter of the invention.

EXAMPLE 1

A motor of 15 h.p. rating at 1,800 RPM, using a NEMA 256 frame, and having a stator with a 100:84.5 turns relationship as previously described, was constructed utilizing a rotor with 48 bars each of 0.265 in. diameter, the bars, end rings and fins being centrifugally cast of Reynolds 443.2 aluminum alloy. The bar length, i.e., lamination stack height, was 6.5 in. The diameter of the rotor was 6.460 in. The end rings had an inside diameter of 3.680 in., and outside diameter of 6.320 in., and a thickness of 0.250 in., this thickness being substantially half of that determined as standard by good conventional design.

EXAMPLE 2

A motor with a 25 h.p. rating at 1,800 RPM, using a NEMA 286 frame, and employing a stator as in Example 1, was constructed with a rotor of 58 bars, each of 0.218 in. diameter, the bars, end rings and fins being of centrifugally cast Reynolds 443.2 aluminum alloy. The bar length was 7.0 in. and the rotor diameter 7.042 in. The end rings had an inside diameter of 4.062 in., an outside diameter of 7.012 in., and a half-standard thickness of 0.312 in.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A rotary dynamoelectric machine having superior electrical characteristics comprising:
   a generally annular stator including a first primary winding and a second primary winding oriented at 90° electrical phase relationship with respect to said first winding, said second winding having approximately 0.845 the number of effective turns of said first winding, said windings, being adapted to be interconnected to a source of single-phase a.c. power; and
   an induction rotor including a cylindrical laminated ferromagnetic core positioned within said stator for rotation about a longitudinal central axis thereof when said stator is energized by the power source, said rotor having a plurality of electrically conductive bars each extending the length of the core adjacent the cylindrical surface thereof, and conductive end rings at the ends of said rotor electrically connected to the ends of said bars at the respective ends of the core thereby to provide a secondary winding, the physical dimensions of said bars and said end rings being such that the resistance of said secondary winding, when calculated on a comparative basis with commercial conventionally designed three-phase induction motors of substantially the same horsepower rating and slip as said machine if comprising a motor, is at least approximately two times the resistance of the secondary winding provided by a squirrel-cage motor rotor of conventional commercial design.

2. A rotary dynamoelectric machine as set forth in claim 1 wherein the resistance of said secondary winding is approximately equal to from approximately two to three times the resistance provided by a squirrel-cage motor rotor of conventional commercial design.

3. A rotary dynamoelectric machine as set forth in claim 2 wherein said end rings are each of generally flat, washer-like form, having a generally uniform thickness along the longitudinal central axis of the rotor, said end ring thickness being approximately from two-thirds to one-fourth of the thickness of end rings of a squirrel-cage motor rotor of conventional commercial design.

4. A rotary dynamoelectric machine as set forth in claim 1 wherein said conductive bars are of generally circular cross section.

5. A rotary dynamoelectric machine as set forth in claim 4 wherein each of said bars has a portion of its surface along its length exposed at the periphery of the rotor.

6. A rotary dynamoelectric machine as set forth in claim 1 constituting a rotary phase converter and wherein at least a portion of said first winding is adapted for being connected across the a.c. power source, and wherein said second winding is adapted for being serially connected with a capacitance from one end of a portion of said first winding to an intermediate tap on said first winding, whereby said dynamoelectric machine constitutes a self-starting rotary phase converter providing three-phase a.c. power at three terminals comprising the opposite ends of portions of said first winding and the junctions between the capacitance and said second winding.

7. A rotary dynamoelectric machine as set forth in claim 1 constituting a motor and wherein said first winding is adapted to be connected with a capacitance across said a.c. source, said second winding being adapted to be connected across said source whereby relatively low inrush current is required upon starting.

8. A rotary dynamoelectric machine comprising:
   a generally annular stator including a first primary winding and a second primary winding oriented at 90° electrical phase relationship with respect to said first winding, said second winding having approximately 0.845 the number of effective turns of said first winding, said windings being adapted to be interconnected with a capacitance to a source of single-phase a.c. power; and an induction rotor including a cylindrical laminated ferromagnetic core positioned within said stator for rotation about a central axis thereof when said stator is energized by the power source, said rotor having a plurality of electrically conductive bars each extending the length of the core adjacent the cylindrical surface thereof and conductive end rings at the ends of said rotor electrically connected to the ends of said bars at the respective ends of the core thereby to provide a secondary winding, said bars and said end rings being configured and dimensioned such as to provide said secondary winding with a relatively high resistance whereby when the first winding is connected across the single-phase a.c. power source and the second winding is serially connected with a capacitance from one side of said a.c. source to an intermediate tap on said first winding, the dynamoelectric machine comprises a self-starting rotary phase converter and three-phase a.c. power is provided at three terminals comprising the opposite ends of portions of said first winding and the junction between the capacitance and said second winding; and whereby when said first winding and a capacitance are connected across said a.c. source and said second winding is connected across said a.c. source the dynamoelectric machine comprises a motor requiring relatively low inrush current upon starting.

9. A self-starting rotary phase converter comprising:

a generally annular stator including a first primary winding and a second primary winding oriented at 90° electrical phase relationship with respect to said first winding, said second winding having approximately 0.845 the number of effective turns of said first winding, at least a portion of said first winding being adapted to be connected across a source of single-phase a.c. power, said second winding being serially connected with a capacitance from one end of a portion of said first winding to an intermediate tap on said first winding; and an induction rotor including a cylindrical laminated ferromagnetic core positioned within said stator for rotation about a central axis thereof when said stator is energized by said a.c. source, said rotor being of single-bar construction having a plurality of electrically conductive bars each extending the length of the core adjacent the cylindrical surface thereof, and conductive end rings at the ends of said rotor electrically connected to the ends of said bars at the respective ends of the core thereby to provide a secondary winding, the physical dimensions of said bars and said end rings being such that the resistance of said secondary winding, when calculated on a comparative basis with commercial conventionally designed three-phase induction motors of substantially the same horsepower rating and slip if said machine constituted a motor, is approximately at least two times the resistance of the secondary winding provided by a squirrel-cage motor rotor of conventional commercial design, whereby said rotary phase converter provides three-phase a.c. power at three terminals comprising the opposite ends of portions of said first winding and the junction between the capacitance and said second winding.

10. A rotary phase converter as set forth in claim 9 wherein the resistance of said secondary winding is approximately equal to from approximately two to three times the resistance provided by a squirrel-cage motor rotor of conventional commercial design.

11. A rotary phase converter as set forth in claim 9 wherein said first winding is constituted by a set of coils, at least one of said coils having a plurality of taps thereon, said intermediate tap comprising a preselected one of said plurality of taps, thereby to provide substantial phase balance of said three-phase a.c. power provided.

12. A rotary phase converter as set forth in claim 11 wherein said plurality of taps comprises a first tap located at approximately the midpoint of said first winding and a second of said taps located at approximately one-fourth of the span of said first winding between one end thereof and said first tap.

13. A rotary phase converter as set forth in claim 12 wherein said plurality of taps comprises a third tap located at approximately the midpoint of the span of said first winding between said first and second taps.

14. A rotary phase converter as set forth in claim 11 wherein said bars of the rotor are each partially exposed along the length thereof at said cylindrical surface of the core.

15. A rotary phase converter as set forth in claim 11 wherein each of said windings comprises multiple sets of coils associated with poles of said converter, said first winding having four such sets of coils connected end-to-end and constituting four portions of said first winding, there being a first junction between the first and second portions, a middle second junction between the second and third portions, and a third junction between the third and fourth portions, said second portion being provided with ones of said taps, said second winding also having four sets of interconnected coils.

16. A rotary phase converter as set forth in claim 15 wherein opposite ends of the second and third portions of said first winding are connected across the single-phase a.c. source which has a first voltage, the four sets of coils of said second winding being adapted for being connected in series with the capacitance from said second junction and said intermediate tap, two of the terminals for providing said three-phase a.c. power being constituted by opposite ends of the first and fourth portions of said first winding whereby said three-phase a.c. power is provided at a second voltage which is substantially twice said first voltage.

17. A rotary phase converter as set forth in claim 16 wherein the sets of coils of said second winding define a midpoint thereof at the junction between two of the sets of coils thereof whereby three-phase a.c. power of a voltage substantially equal to said first voltage is also provided at three terminals comprising said midpoint and said first and third junctions.

18. A rotary phase converter as set forth in claim 15 wherein opposite ends of the first and fourth portions of said first winding are connected across the single-phase a.c. source which has a first voltage, the four sets of coils of said second winding being connected such that there are two parallel-connected pairs of series-connected pairs thereof, all four of which sets are connected in series with the capacitance from one side of said a.c. source and said intermediate tap, two of the three terminals for providing said three-phase a.c. power being constituted by said second and third junctions whereby said three-phase a.c. power is provided at a second voltage which is substantially one-half said first voltage.

19. A motor comprising:

a generally annular stator including a first primary winding and a second primary winding oriented at 90° electrical phase relationship with respect to said first winding, said second winding having approximately 0.845 the number of effective turns of said first winding, said first winding being adapted to be connected in series with a capacitance across a source of single-phase a.c. power, said second winding being connected across said a.c. source; and an induction rotor including a cylindrical laminated ferromagnetic core positioned within said stator for rotation about a central axis thereof when said stator is energized by said a.c. source, said rotor being of a single-bar construction having a plurality of electrically conductive bars each extending the length of the core adjacent the cylindrical surface thereof, and conductive end rings at the ends of said rotor electrically connected to the ends of said bars at the respective ends of the core thereby to provide a secondary winding, the physical dimensions of said bars and said end rings being such that the resistance of said secondary winding, when calculated on a comparative basis with commercial conventionally designed three-phase induction motors of substantially the same horsepower rating and slip as said motor, is approximately at least two times the resistance of the secondary winding provided by a squirrel-cage motor rotor of conventional commercial design, whereby said motor requires relatively low inrush current upon starting.

20. A motor as set forth in claim 19 wherein the resistance of said secondary winding is approximately equal to from approximately two to three times the resistance provided by a squirrel-cage motor rotor of conventional commercial design.

21. A motor as set forth in claim 19 wherein each of said windings comprises a plurality of sets of coils, the sets of coils of said second winding defining two sections thereof, said sections being adapted alternatively for connection in parallel for normal operation of said motor on said a.c. power source having a first voltage, or for connection in series for normal operation of said motor on said a.c. power source having a second voltage substantially twice said first voltage.

22. A motor as set forth in claim 19 wherein said first winding includes a midpoint, one end of said second winding being adapted to be connected to said midpoint whereby said motor is adapted to be operated alternatively from a source of three-phase a.c. power by connecting thereto the opposite ends of said first winding and the remaining end of said second winding.

23. A motor as set forth in claim 19 wherein said motor is adapted to be operated from a source of two-phase a.c. power by connecting said first winding across one phase of said two-phase source and said second winding across the other phase of said two-phase a.c. source.

24. A motor system having extremely low inrush current upon motor starting, comprising:
  a motor, including
    a generally annular stator including a first primary winding and a second primary winding oriented at 90° electrical phase relationship with respect to said first winding, said second winding having approximately 0.845 the number of effective turns of said first winding, said first winding having a pair of sections each having half the number of effective number of turns of said second winding;
    an induction rotor including a cylindrical laminated ferromagnetic core positioned within said stator for rotation about a central axis thereof, said rotor having a plurality of peripheral parallel slots extending generally axially at the cylindrical surface of the core, respective electrically conductive bars in said slots each extending the length of said slots to provide single-bar construction, and conductive end rings at the ends of said rotor electrically connected to the ends of said bars at the respective ends of the core thereby to provide a secondary winding, the physical dimensions of said bars and said end rings being such as to provide said secondary winding with a relatively high resistance; and a capacitance;
  means for connecting one end of said first winding to one side of a source of single-phase a.c. power and the other end of said first winding through said capacitance to the other side of said a.c. source; and
  means for connecting the sections of said second winding in series circuit relationship across said a.c. source for starting of said motor, and for connecting said sections in parallel circuit relationship across said a.c. source for running of said motor following starting whereby the maximum inrush current upon motor starting is of approximately the same magnitude as the current supplied to said motor during normal full-load running thereof.

25. The method of operating a three-phase a.c. electrical load from a source of single-phase power comprising:
  winding the stator of a rotary dynamoelectric machine with a first primary winding and a second primary winding oriented at 90° electrical phase relationship with respect to said first winding and having approximately 0.845 the number of effective turns of said first winding;
  providing a single-bar rotor for rotation in the bore of said stator, the rotor having a laminated magnetic core and a plurality of electrically conductive bars each extending the length of the core and conductive end rings at the ends of the rotor electrically connected to the ends of the bars at the respective ends of the core thereby to provide a secondary winding;
  restricting the physical dimensions of said bars and said end rings such that the resistance of said secondary winding, when calculated on a comparative basis with commercial conventionally designed three-phase induction motors of substantially the same horsepower rating and slip as said machine if comprising a motor, is approximately equal to from two to three times the resistance of the secondary winding provided by a squirrel-cage motor rotor of conventional commercial design;
  connecting said first winding to said a.c. source and said second winding in series with a capacitance from one side of said a.c. source to an intermediate tap on said first winding; and
  connecting said load to three terminals comprising the opposite ends of portions of said first winding and the junction between the capacitance and said second winding whereby three-phase a.c. power is supplied to said load.

* * * * *